US009430266B2

United States Patent
Takeuchi

(10) Patent No.: US 9,430,266 B2
(45) Date of Patent: Aug. 30, 2016

(54) ACTIVATING A SUBPHYSICAL DRIVER ON FAILURE OF HYPERVISOR FOR OPERATING AN I/O DEVICE SHARED BY HYPERVISOR AND GUEST OS AND VIRTUAL COMPUTER SYSTEM

(71) Applicant: HITACHI, LTD., Tokyo (JP)

(72) Inventor: Tadashi Takeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 307 days.

(21) Appl. No.: 14/083,493

(22) Filed: Nov. 19, 2013

(65) Prior Publication Data

US 2014/0149985 A1 May 29, 2014

(30) Foreign Application Priority Data

Nov. 26, 2012 (JP) ................................ 2012-257255

(51) Int. Cl.
*G06F 9/455* (2006.01)
*G06F 9/50* (2006.01)
*G06F 11/14* (2006.01)
*G06F 11/20* (2006.01)

(52) U.S. Cl.
CPC ......... *G06F 9/45558* (2013.01); *G06F 9/4555* (2013.01); *G06F 9/45533* (2013.01); *G06F 9/5077* (2013.01); *G06F 11/1438* (2013.01); *G06F 11/1484* (2013.01); *G06F 11/2023* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 5,437,033 A | 7/1995 | Inoue et al. | |
| 2004/0187106 A1* | 9/2004 | Tanaka | G06F 9/5077 718/1 |
| 2005/0204366 A1* | 9/2005 | Billau | G06F 9/5077 719/324 |
| 2008/0126579 A1* | 5/2008 | Corneli | G06F 9/5088 710/5 |
| 2009/0144731 A1* | 6/2009 | Brown | G06F 13/102 718/1 |
| 2012/0102491 A1* | 4/2012 | Maharana | G06F 9/45558 718/1 |
| 2012/0297379 A1* | 11/2012 | Anderson | G06F 9/45558 718/1 |
| 2013/0160002 A1* | 6/2013 | Graham | G06F 9/45558 718/1 |
| 2014/0006877 A1* | 1/2014 | Zhu | G06F 11/3466 714/45 |

FOREIGN PATENT DOCUMENTS

JP 05-012045 A 1/1993

* cited by examiner

*Primary Examiner* — Abu Ghaffari
(74) *Attorney, Agent, or Firm* — Mattingly & Malur, PC

(57) ABSTRACT

A control method for an I/O device, the I/O device being shared by a hypervisor and a first guest OS, the hypervisor comprising a physical driver for using a physical function, the first guest OS comprising a virtual driver for using a virtual function, the control method comprising: a first step of acquiring, by the hypervisor, a state of the I/O device via the physical driver; a second step of monitoring, by the first guest OS, the hypervisor, thereby determining whether the hypervisor has been brought into a predetermined state or not; a third step of activating, by the first guest OS, a sub physical driver for operating the I/O device when the first guest OS determines that the hypervisor has been brought into the predetermined state; and a fourth step of carrying out, by the first guest OS, transmission/reception via a queue set in advance on the memory.

10 Claims, 15 Drawing Sheets

130

PHYSICAL LINK STATE

201 LINK-UP STATE

| | PF | VF1 | VF2 | VF3 | ... | VFn |
|---|---|---|---|---|---|---|
| 210 PHYSICAL STATE | UP | UP | UP | DOWN | ... | DOWN |
| 211 NOTIFIED STATE | | UP | UP | DOWN | ... | DOWN |

202 LINK BANDWIDTH STATE

| | | VF1 | VF2 | VF3 | ... | VFn |
|---|---|---|---|---|---|---|
| 220 PHYSICAL STATE | MAX | 1G | 1G | 1G | ... | 1G |
| | ASSIGNMENT | 1G | 1G | 1G | ... | 1G |
| 230 NOTIFIED STATE | MAX | 1G | 1G | 1G | ... | 1G |
| | ASSIGNMENT | 1G | 0.5G | 1G | ... | 1G |

221, 222, 231, 232

*FIG. 3*

ACTIVATING A SUBPHYSICAL DRIVER ON FAILURE OF HYPERVISOR FOR OPERATING AN I/O DEVICE SHARED BY HYPERVISOR AND GUEST OS AND VIRTUAL COMPUTER SYSTEM

CLAIM OF PRIORITY

The present application claims priority from Japanese patent application JP 2012-257255 filed on Nov. 26, 2012, the content of which is hereby incorporated by reference into this application.

BACKGROUND

This invention relates to an access control method for a shared I/O device.

As a method for operating a first guest OS and a second guest OS on a hypervisor, and keeping the first guest OS operating even after a failure occurs to the hypervisor, a method described in Japanese Patent Application Laid-open No. Hei 5-12045 is known.

The method involves (1) exclusively assigning a physical address area to the first guest OS so that a physical address (guest absolute address) used by the first guest OS operating on the hypervisor and a host absolute address are the same, (2) exclusively assigning the first guest OS with a physical CPU having the same CPU number as a CPU number used when the first guest OS operates on the hypervisor, and (3) exclusively assigning the first guest OS with a physical interrupt having the same interrupt number as an interrupt used when the first guest OS operates on the hypervisor. Then, when the hypervisor fails, subsequently, the first guest OS continues execution not on the hypervisor but on physical hardware. The physical address, the CPU number, and the interrupt number are the same both on the hypervisor and the physical hardware, and hence the first guest OS can continue operation even after the hypervisor fails.

SUMMARY

However, the above-mentioned conventional example does not assume such a configuration that the first guest OS makes access to an I/O device such as an NIC via an emulator implemented in the hypervisor, and, if this configuration is realized, a continued operation (particularly, a continued I/O) of the first guest OS cannot be guaranteed after the hypervisor fails.

If an I/O device such as an NIC compliant with the single root I/O virtualization (SR-IOV) specification is shared among the hypervisor, the first guest OS, and the second OS, such a configuration that the emulator in the hypervisor emulates a part of a function of the I/O device, and, when the first guest OS or the second guest OS uses the part of the function of the I/O device, the first guest OS or the second guest OS makes access to the I/O device via the emulator is provided.

In recent years, as the virtual computers prevail, a technology for sharing an I/O device by a plurality of virtual computers (guest OSs) has been proposed, and, for example, the SR-IOV is known.

The method disclosed in Japanese Patent Application Laid-open No. Hei 5-12045 has such a problem that, if an I/O device compliant with the SR-IOV specification is shared among the hypervisor, the first guest OS, and the second guest OS, an I/O of the first guest OS cannot be continued after the hypervisor fails.

A representative aspect of the present disclosure is as follows. A control method for an I/O device, in a computer comprising a processor, a memory, and the I/O device, the I/O device being shared by a hypervisor and a first guest OS, the I/O device comprising a physical function and a virtual function, the hypervisor comprising a physical driver for using the physical function, the first guest OS comprising a virtual driver for using the virtual function, the control method comprising: a first step of acquiring, by the hypervisor, a state of the I/O device via the physical driver; a second step of monitoring, by the first guest OS, the hypervisor, thereby determining whether the hypervisor has been brought into a predetermined state or not; a third step of activating, by the first guest OS, a sub physical driver for operating the I/O device when the first guest OS determines that the hypervisor has been brought into the predetermined state; and a fourth step of carrying out, by the first guest OS, transmission/reception via a queue set in advance on the memory.

According to one embodiment of this invention, if the I/O device compliant with the SR-IOV specification having the physical function (PF) and the virtual function (VF) is shared among the hypervisor, the first guest OS, and the second guest OS, the I/O can be continued by the first guest OS even after the hypervisor fails.

BRIEF DESCRIPTION OF THE DRAWINGS

FIG. 3 is a diagram illustrating an example of a data structure of the physical link state according to the first embodiment of this invention.

DETAILED DESCRIPTION OF THE PREFERRED EMBODIMENTS

A description is now given of embodiments of this invention referring to the accompanying drawings.

First Embodiment

Figure 1:
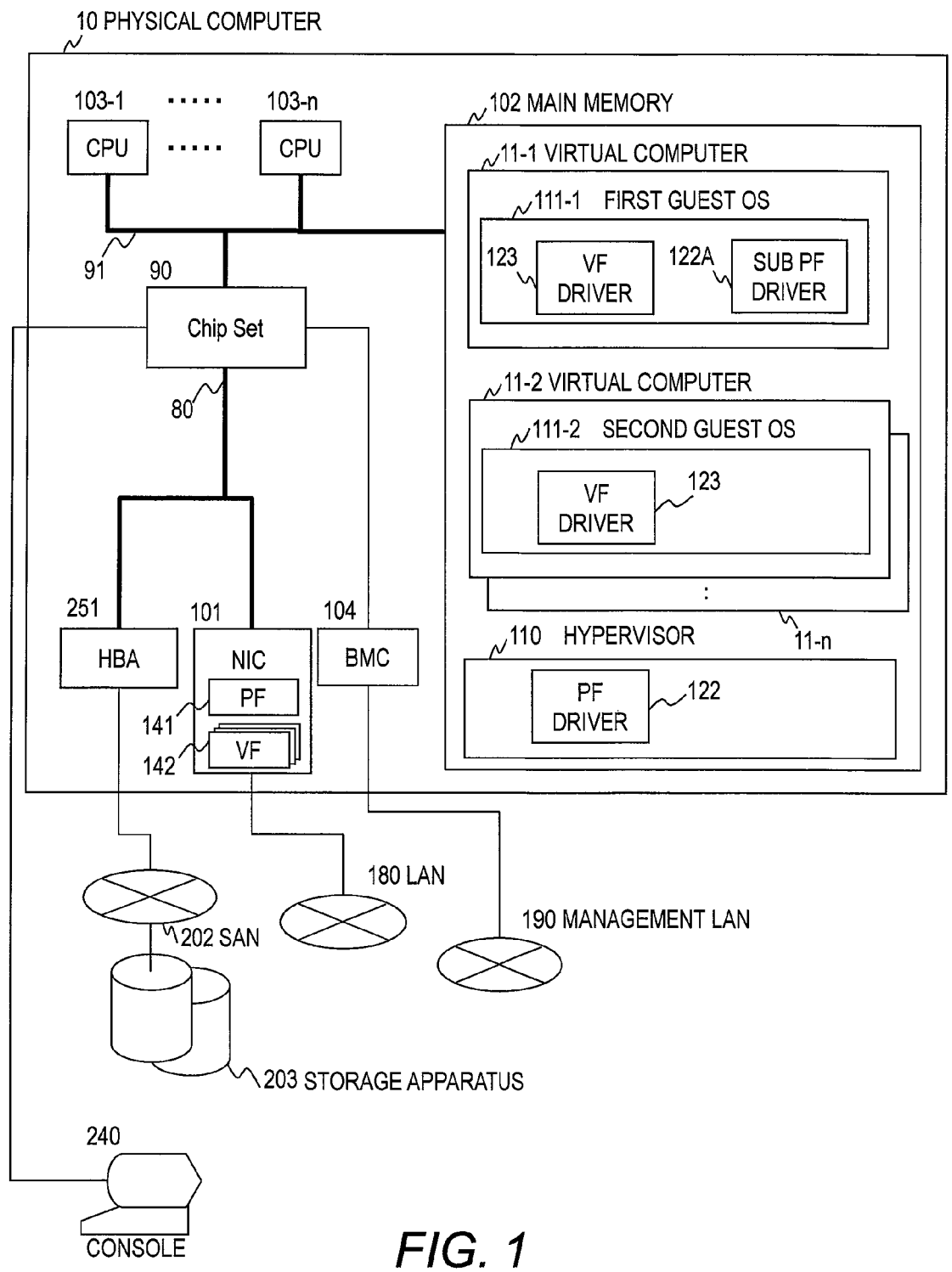
FIG. 1 is a block diagram illustrating an example of the configuration of the virtual computer system according to a first embodiment of this invention.

First, a description is given of a configuration of a virtual computer system to which this invention is applied. FIG. 1 is a block diagram illustrating an example of the configuration of the virtual computer system. A physical computer 10 includes a plurality of CPUs 103-1 to 103-n, and the CPUs 103-1 to 103-n are coupled via an interconnect 91 to a chipset 90 and a main memory 102. It should be noted that the CPUs 103-1 to 103-n in FIG. 1 are generally referred to as CPUs 103.

A console 240 including input/output devices, and I/O devices are coupled via a PCI Express interface or the like to the chipset 100. The I/O devices are constructed by a network interface card (NIC) 101 coupled to a LAN (or network) 180, a host bus adapter (HBA) 251 coupled via a storage area network (SAN) 202 to a storage apparatus 203 and the like, and the like.

The CPUs 103 make access via the interconnect 91 to the main memory 102. Moreover, the CPUs 103 make access via the chipset 90 to the I/O devices such as the NIC 101, thereby carrying out predetermined processing. Similarly, the I/O devices such as the NIC 101 make access via the chipset 100 to the main memory 102.

Moreover, a baseboard management controller (BMC) 104 is coupled to the chipset 90. The BMC 104 monitors the state of the physical computer 10, and carries out power supply control for the physical computer 10. The BMC 104 is further coupled via a management LAN 190 to a management computer (not shown).

Figure 2:
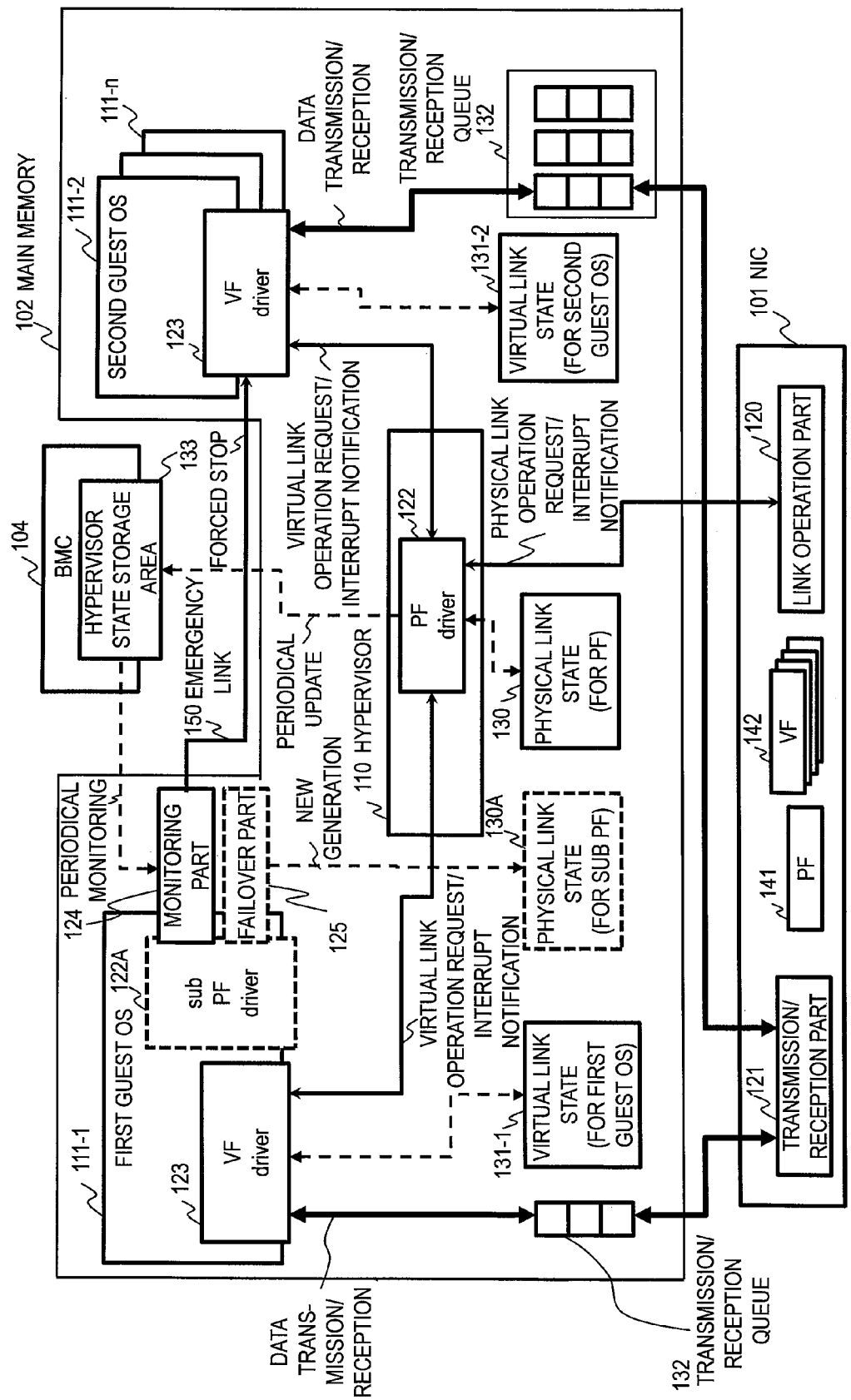
FIG. 2 is a functional block diagram illustrating a principal part of the virtual computer system according to the first embodiment of this invention.

A hypervisor 110 is loaded onto the main memory 102, and is executed by the CPUs 103, thereby assigning computer resources of the physical computer 10 to a plurality of virtual computers 11-1, and 11-2 to 11-n. It should be noted that a first guest OS 111-1 and second guest OSs 111-2 to 111-n, which are illustrated in FIG. 2, are executed on the respective virtual computers 11-1, and 11-2 to 11-n. The virtual computers are generally designated by reference numeral 11, and the guest OSs are generally designated by reference numeral 111 hereinafter. The same holds true for other components' reference numerals, and "-n" is used to identify each component, and components are generally designated by reference numeral without "-".

Such an example that the NIC 101 is compliant with the SR-IOV, and is constructed by a multi-queue I/O device having a plurality of transmission/reception queues 132 set on the main memory 102. It should be noted that the HBA 251 may be constructed by a multi-queue I/O device. Moreover, the physical computer 10 may include a plurality of I/O devices such as the NIC 101 and the HBA 251.

The NIC 101 includes a physical function (hereinafter referred to as PF) 141 and virtual functions (hereinafter referred to as VFs) 142 compliant with the SR-IOV. The PF 141 can set at least one VF 142.

The hypervisor 110 includes a PF driver 122 using the PF 141 of the NIC 101. Each of the first guest OS 111-1 and the second guest OS 111-2 of the virtual computers 11-1 and 11-2 includes a VF driver 123 using the VFs 142 of the NIC 101. On this occasion, the first guest OS 111-1 of the virtual computer 11-1 includes a sub PF driver 122A (also illustrated in FIG. 2) which functions when the hypervisor 110 fails as described later.

Then, the hypervisor 110 assigns VFs 142 to the virtual computers 11-1 and 11-2, thereby sharing the NIC 101. In this embodiment, the hypervisor 110 only needs to be a virtualization part for logically dividing the computer resources of the physical computer 10 into logical resources (or logical partitions), and assigning the logical resources to the virtual computers 11.

FIG. 2 is a functional block diagram illustrating a principal part of the virtual computer system. The hypervisor 110, the first guest OS 111-1, and the second guest OS 111-2 are executed on the CPUs 103. The hypervisor 110, the first guest OS 111-1, and the second guest OS 111-2 carry out, via the NIC 101, input/output (I/O) from/to the network 180, and arranges data structures required for executing the I/O on the main memory 102. Moreover, the main memory 102 is also used as storage areas for link states to the NIC 101 managed by the hypervisor 110, the first guest OS 111-1, and the second guest OS 111-2.

A transmission/reception part 121 and a link operation part 120 are installed on the NIC 101. The transmission/reception part 121 is activated directly from the VF drivers 123 of the first guest OS 111-1 and the second guest OS 111-2. Data transmitted/received by the NIC 101 is transmitted/received via the transmission/reception queues (multi-queue) 132 on the main memory 102.

On the other hand, the link operation part 120 is operated (controlled to issue a physical link operation request) by the PF driver 122 of the hypervisor 110. Moreover, the PF driver 122 of the hypervisor 110 is notified also of interrupts from the PF 141 and the VFs 142 of the NIC 101. A state of a physical link of the NIC 101 is stored in a physical link state 130 on the main memory 102, and is managed by the PF driver 122.

Moreover, the PF driver 122 of the hypervisor 110 emulates a link operation carried out on the NIC 101. Then, the PF driver 122 transmits/receives a virtual link operation request and an interrupt notification to/from the VF drivers 123 of the first guest OS 111-1 and the second guest OS 111-2. Then, the first guest OS 111-1 and the second guest OS 111-2 respectively store coupling states recognized by the VF drivers 123 in virtual link states 131-1 and 131-2 on the main memory 102.

The first guest OS 111-1 also includes a sub PF driver 122A. The sub PF driver 122A includes a monitoring part 124 for monitoring the BMC 104, thereby monitoring an operation state of the hypervisor 110, and a failover part 125 for taking over the state of the PF driver 122 to the sub PF driver 122A when the hypervisor 110 fails.

A hypervisor state storage area 133 is stored in the BMC 104, and is periodically (at a predetermined cycle) updated by the PF driver 122. The BMC 104 includes a processor and a memory which are not shown, and stores the hypervisor state storage area 133 in the memory.

The monitoring part 124 of the sub PF driver 122A detects generation of a failure in the hypervisor 110 by detecting that the hypervisor state storage area 133 has not been updated for a certain period or more.

When the monitoring part 124 detects a failure, the sub PF driver 122A activates the failover part 125, reconfigures the physical link state 130 on the main memory 102, and generates a physical link state 130A for the sub PF driver 122A on the main memory 102. Subsequently, the VF driver 123 of the first guest OS 111-1 issues the virtual link operation request, and receives the interrupt notification via the sub PF driver 122A in place of the PF driver 122 of the hypervisor 110, thereby enabling continuing of the I/O by the first guest OS 111-1 after the hypervisor 110 fails. The physical link state 130A for the sub PF driver 122A is configured in the same way as the physical link state 130 for the PF drier 122.

Virtual networks (or virtual switches) provided by the hypervisor 110 are used for coupling between the first guest OS 111-1 and the hypervisor 110 and coupling between the second guest OS 111-2 and the hypervisor 110.

On the other hand, an emergency link 150 for coupling between the monitoring part 124 of the sub PF driver 122A and the VF driver 123 of the second guest OS 111-2 carries out communication by using an area set in advance on the main memory 102, and can be used even if the hypervisor 110 stops.

Then, referring to FIGS. 3 to 6, a description is given of various data structures stored in the main memory 102 and the BMC 104.

FIG. 3 is a diagram illustrating an example of a data structure of the physical link states 130 and 130A. The physical link state 130 includes a link up state 201 as a state representing whether each of the VFs 142 and the PF 141 links up or links down, and a link bandwidth state 202 representing a physical bandwidth amount set to each of the VFs 142 when the VF 142 links up.

As described later, the physical link state 130 is managed by the PF driver 122. First, the link up state 201 is constructed by two types of information including a physical state 210 representing a physical coupling state of each of the PF 141 and the VFs 142, and a notified state 211 storing a coupling state of each of the VFs 142 notified to the guest OS 111 of each of the virtual computers 11. In FIG. 3, the VFs 142 represent a state where n VFs of VF1 to VFn are generated. Moreover, in FIG. 3, "UP" represents a state where coupling to the LAN 180 is present, and "DOWN" represents a state where coupling to the LAN 180 is not present.

The link bandwidth state 202 is constructed by information including a physical state 220 representing physical bandwidths of the NIC 101 and a notified state 230 storing a bandwidth for each of the VFs 142 notified to the guest OS 111 of each of the virtual computers 11. For the PF 141, the hypervisor 110 itself uses the PF driver 122, and a notification is thus not necessary.

The physical state 220 is constructed by a MAX 221 representing the maximum value of a bandwidth which can be set to each of the VFs 142, and an assignment 222 which is a bandwidth assigned to each of the VFs 142. Moreover, the notified state 230 is constructed by a MAX 231 representing the maximum value of the bandwidth which can be assigned and is notified to each of the VFs 142, and an assignment 232 representing a bandwidth actually assigned to the virtual computer 11. It should be noted that in FIG. 3, a unit of the bandwidth is bits per second.

The physical link state 130A of the sub PF driver 122A of the first guest OS 111-1 is constructed in the same way as in FIG. 3.

Figure 4:
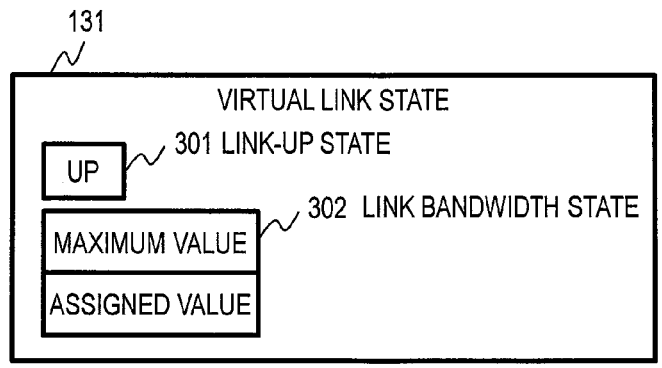
FIG. 4 is a diagram illustrating an example of a data structure of the virtual link state according to the first embodiment of this invention.

FIG. 4 is a diagram illustrating an example of a data structure of the virtual link state 131. The virtual link state 131 is set for each of the VF drivers 123. The virtual link state 131 includes a link up state 301 representing a link up state of the VF 142 recognized by each guest OS 111, and a link bandwidth state 302 for storing a link bandwidth recognized by each guest OS 111. The link up state corresponds to the notified state 211 constructing the link up state 201 of the physical link state 130 illustrated in FIG. 3.

The link bandwidth state 302 includes a "maximum value" for storing the maximum value of the bandwidth which can be assigned, and an "assigned value" actually assigned. The "maximum value" corresponds to the MAX 231 and the assignment 232 of the notified state 230 constructing the link bandwidth state 202 of the physical link state 130 illustrated in FIG. 3.

Figure 5:
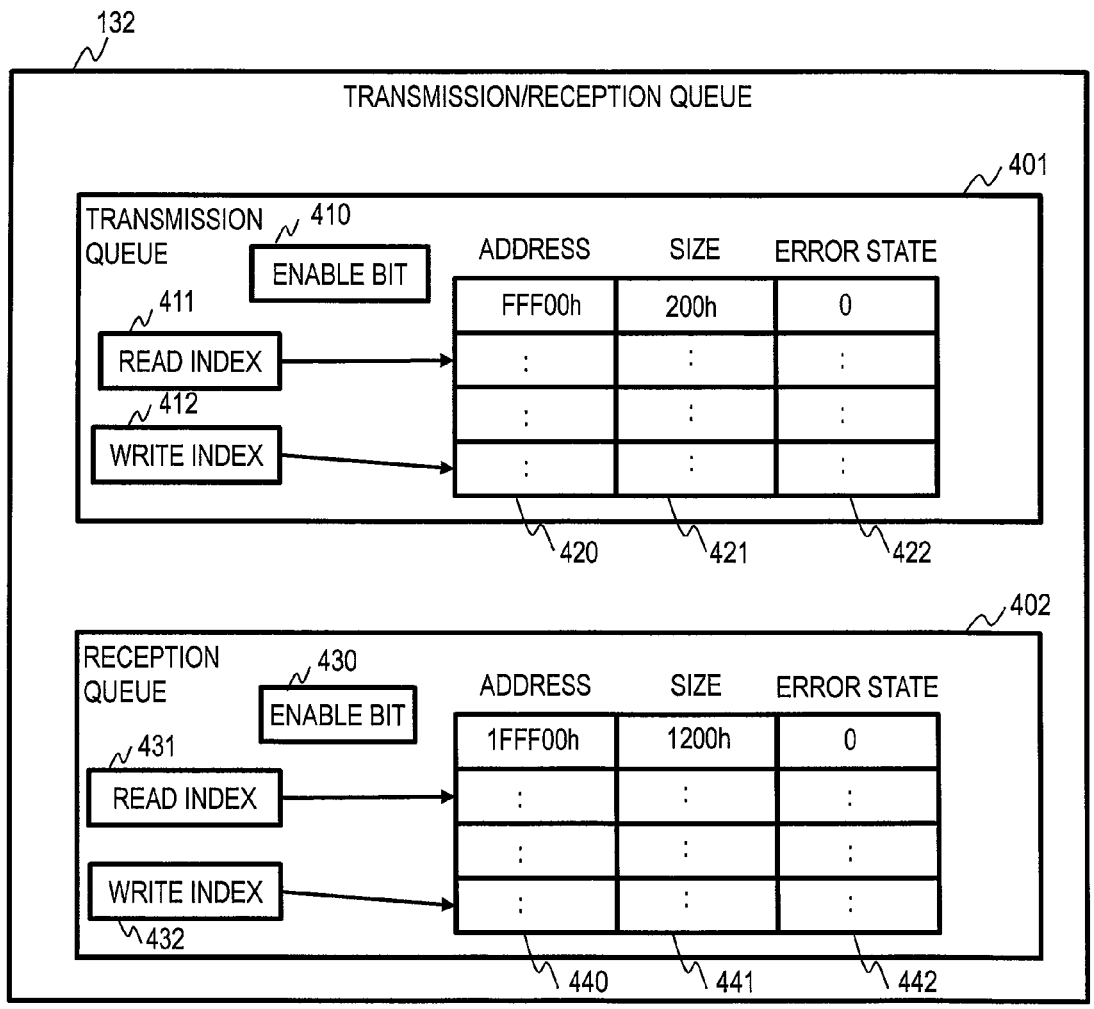
FIG. 5 is a diagram illustrating an example of a data structure of the transmission/reception queue according to the first embodiment of this invention.

FIG. 5 is a diagram illustrating an example of a data structure of the transmission/reception queue 132. The transmission/reception queue 132 is constructed by a transmission queue 401 and a reception queue 402.

The transmission queue 401 includes an enable bit 410, which is illustrated in FIG. 5, and controls whether the NIC 101 should carry out transmission/processing via the queue or not. Moreover, the transmission queue 401 includes a ring queue having entries each constructed by an address 420, a size 421, and an error state 422. Each ring queue includes a read index 411 and a write index 412, which are illustrated in FIG. 5. One of the NIC 101 and the VF driver 123 which carries out enqueueing processing sets the write index 412, and the other thereof which carries out dequeueing processing sets the read index 411, thereby recognizing data (data which have not been transmitted yet) in the queue.

The reception queue 402 includes an enable bit 430, which is illustrated in FIG. 5, and controls whether the NIC 101 should carry out reception processing via the queue or not. Moreover, the reception queue 402 includes a ring queue having entries each constructed by an address 440, a size 441, and an error state 442. Each ring queue includes a read index 431 and a write index 432, which are illustrated in FIG. 5. One of the NIC 101 and the VF driver 123 which carries out enqueueing processing sets the write index 432, and the other thereof which carries out dequeueing processing sets the read index 431, thereby recognizing data (data which have not been received yet) in the queue.

Figure 6:
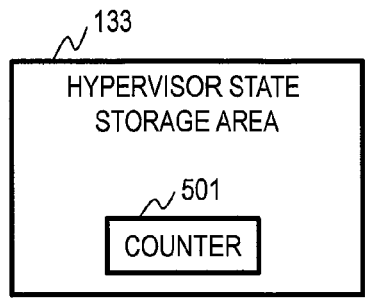
FIG. 6 is a diagram illustrating an example of a data structure of the hypervisor state storage area according to the first embodiment of this invention.

FIG. 6 is a diagram illustrating an example of a data structure of the hypervisor state storage area 133. The hypervisor state storage area 133 is stored in the memory (not shown) of the BMC 104.

The hypervisor state storage area 133 includes a counter 501. The PF driver 122 of the hypervisor 110 periodically counts up the counter 501. As a result, the monitoring part 124 of the sub PF driver 122A can detect generation of a failure on the hypervisor 110 by detecting that the count up of the counter 501 stops for a certain period or more.

Referring to FIGS. 7 to 18, a description is now given of examples of processing carried out by the NIC 101, the PF driver 122 of the hypervisor 110, the VF driver 123 of the first guest OS 111-1 or the second guest OS 111-2, and the sub PF driver 122A of the first guest OS.

Figure 7:
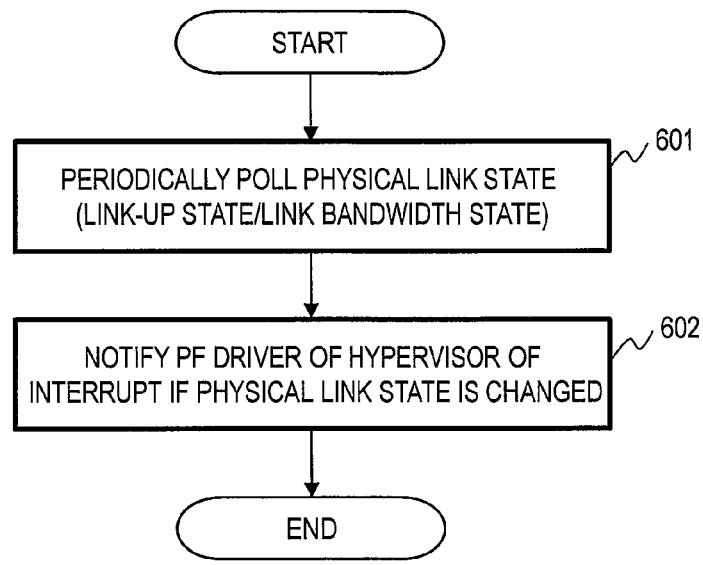
FIG. 7 is a flowchart illustrating an example of the periodical polling according to the first embodiment of this invention.
Figure 8:
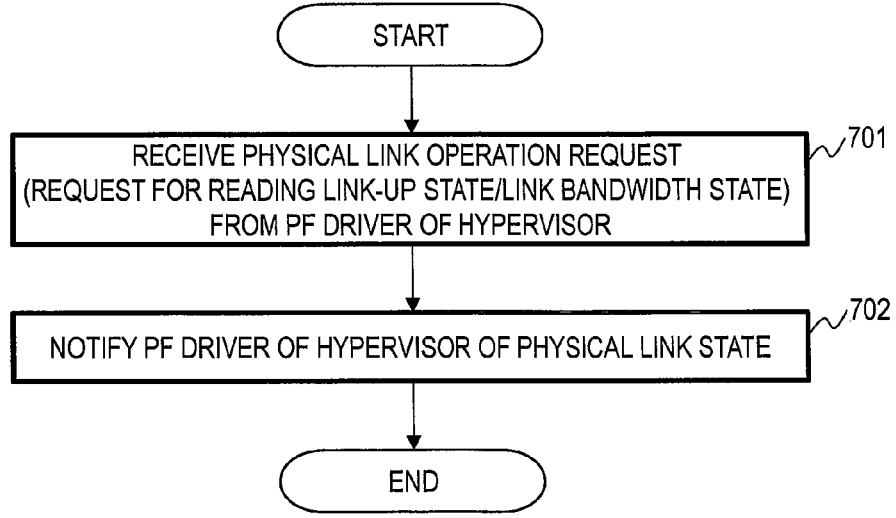
FIG. 8 is a flowchart executed by the link operation part when a physical link operation request is received from the PF driver according to the first embodiment of this invention.

FIGS. 7 and 8 are flowcharts illustrating examples of processing carried out by the link operation part 120 of the NIC 101. The link operation part 120 of the NIC 101 is triggered to start operation by a periodical polling or reception of a physical link operation request from the PF driver 122.

FIG. 7 is a flowchart illustrating an example of the periodical polling.

FIG. 8 is a flowchart illustrating an example of the processing triggered by the reception of a physical link operation request from the PF driver 122.

FIG. 7 illustrates the polling carried out periodically (at a predetermined cycle) by the link operation part 120 at a timer event of the physical computer 10 or the like. In Step 601, the link operation part 120 polls the physical link state (the link up state and the link down state) by periodically acquiring the states of the PF 141 and VFs 142. In Step 602, if the link operation part 120 detects a change in the physical link state, the link operation part 120 notifies the PF driver 122 of the hypervisor 110 of an interrupt. The PF driver 122 is triggered by the interrupt notification to issue a physical link operation request, thereby updating the physical link state 130. A detailed description thereof is given referring to FIG. 11.

FIG. 8 is a flowchart executed by the link operation part 120 when a physical link operation request is received from the PF driver 122.

In Step 701, the link operation part 120 receives a physical link operation request (request for reading the link up state/link bandwidth state) from the PF driver 122. Then, in Step 702, the link operation part 120 notifies the PF driver 122 of a new physical link state (link up state/link bandwidth state).

Figure 9:
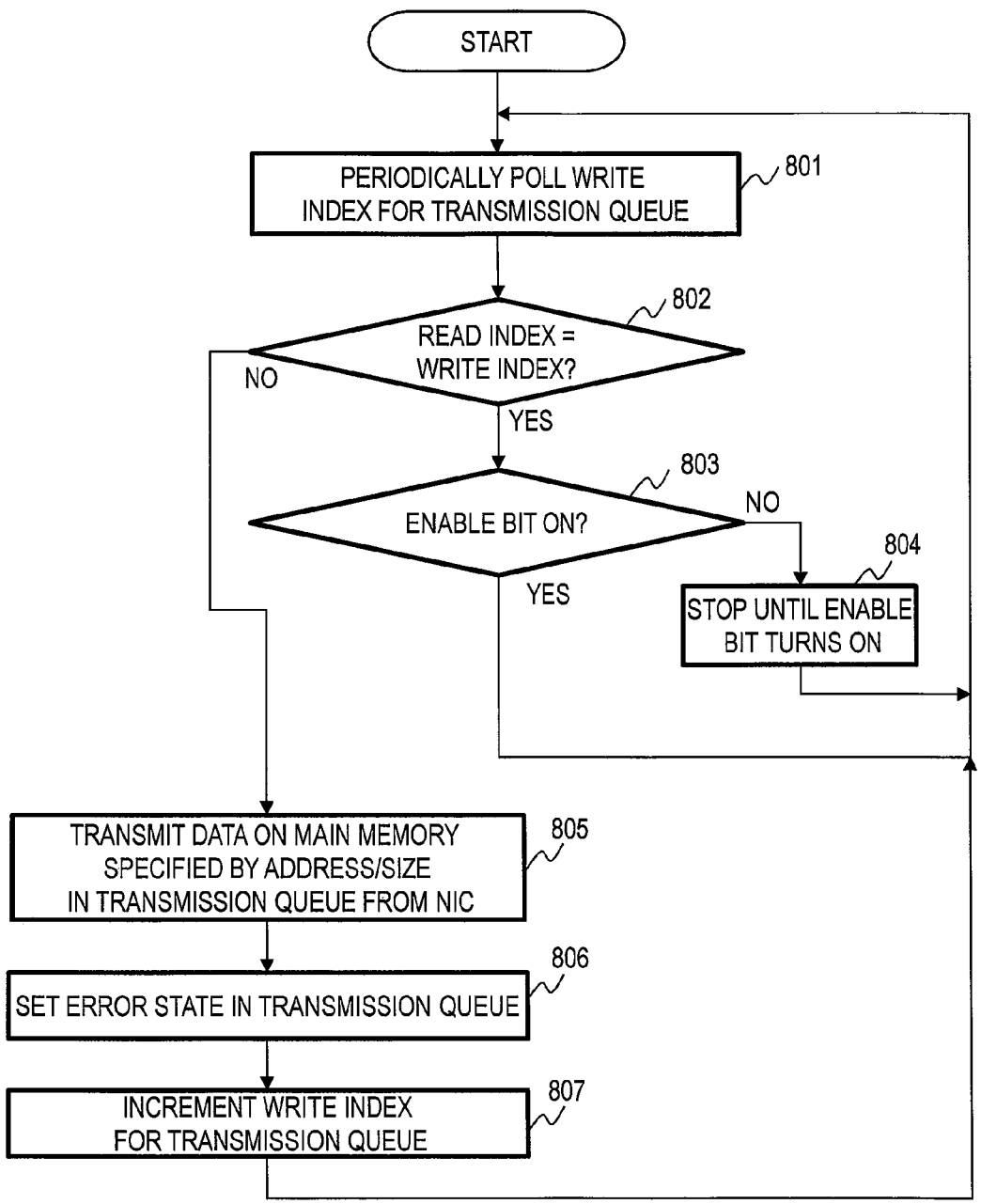
FIG. 9 is the flowchart of the periodical polling processing carried out by the transmission/reception part according to the first embodiment of this invention.
Figure 10:
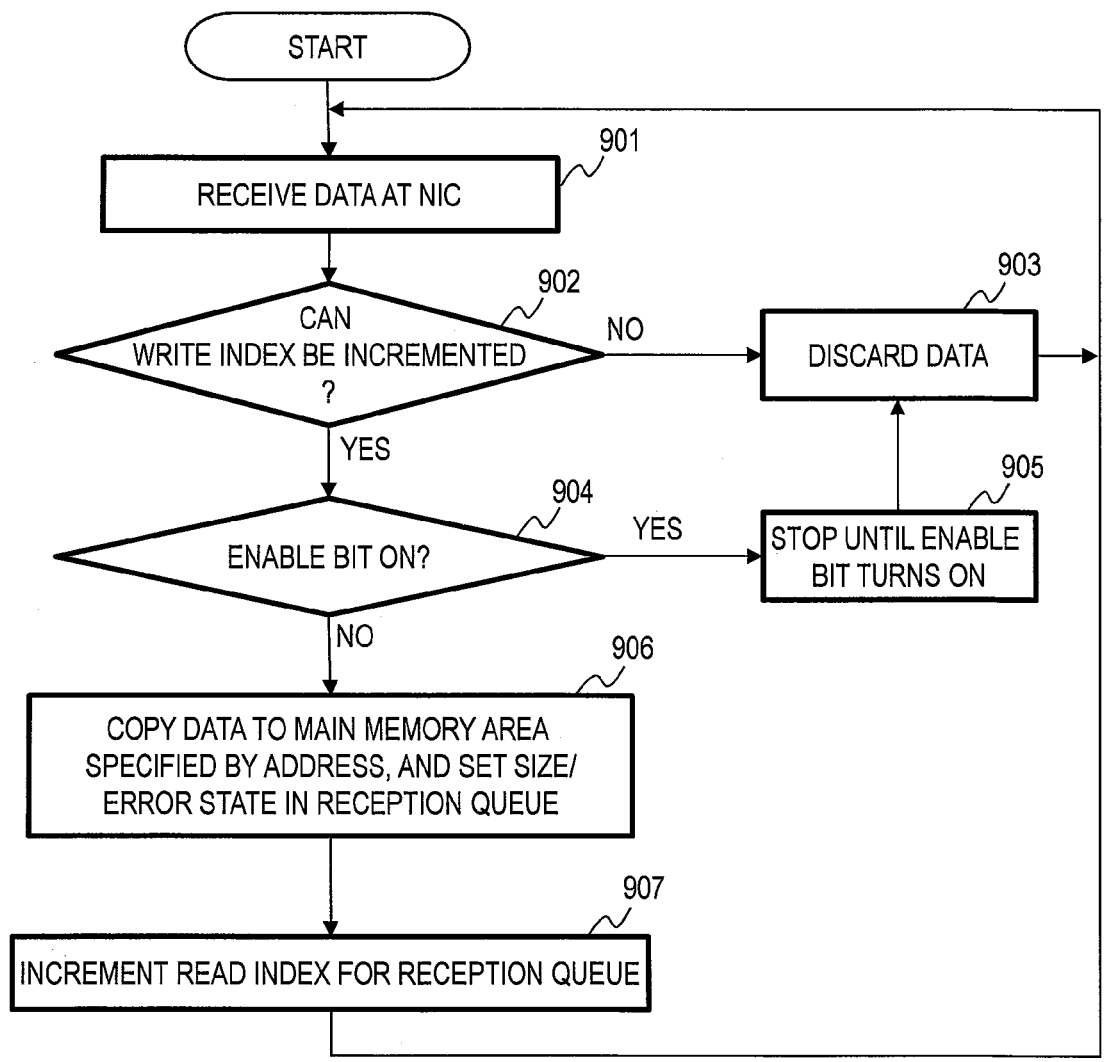
FIG. 10 is a flowchart of the processing triggered by the data reception and carried out by the transmission/reception part according to the first embodiment of this invention.

FIGS. 9 and 10 are flowcharts illustrating examples of processing carried out by the transmission/reception part 121 of the NIC 101. The transmission/reception part 121 of the NIC 101 is triggered to start the processing by a periodical polling or a data reception. FIG. 9 is a flowchart illustrating the processing triggered by the periodical polling, and carried out by the transmission/reception part 121. FIG. 10 is a flowchart illustrating an example of the processing triggered by the reception of data, and carried out by the transmission/reception part 121.

FIG. 9 is the flowchart of the periodical polling processing carried out by the transmission/reception part 121. In Step 801, the transmission/reception part 121 polls periodically (at a predetermined cycle) the write index 412 of each of the transmission queues 401.

Then, in Step 802, the transmission/reception part 121 determines whether the read index 411 and the write index 412 of each of the transmission queues 401 are equal to each other or not (whether queued data which has not been transmitted exists or not), proceeds to Step 803 if the indices are equal to each other, and proceeds to Step 805 if the indices are not equal to each other.

In Step 803, the transmission/reception part 121 determines whether the enable bit 410 of the transmission queue 401 is on or not, and immediately returns to Step 801 if the enable bit 410 is on (if the transmission processing needs to be continued). On the other hand, if the enable bit 410 is off, in Step 804, the transmission/reception part 121 waists until the enable bit 410 turns on again, and returns to Step 801 if the enable bit 410 again turns on.

In Step 805, the transmission/reception part 121 transmits data on the main memory 102 specified by the address 420 and the size 421 field of an entry specified by the read index 411 from the NIC 101 (execution of the transmission processing for data which has not been transmitted). Then, in Step 806, the transmission/reception part 121 sets the error state 806 of the entry to a predetermined value (such as "0") representing a normal end. Then, in Step 807, the transmission/reception part 121 increments the read index 411. Then, the transmission/reception part 121 returns to Step 801.

FIG. 10 is a flowchart of the processing triggered by the data reception and carried out by the transmission/reception part 121. In Step 901, the transmission/reception part 121 receives data at the NIC 101. Then, in Step 902, the transmission/reception part 121 determines whether the write index 432 of the reception queue 402 can be incremented or not (whether a free entry exists in the reception queue 402 or not). Then, if a free entry does not exist, the transmission/reception part 121 proceeds to Step 903, discards the received data, and returns to Step 901.

On the other hand, if a free entry exists, the transmission/reception part 121 proceeds to Step 904. In Step 904, the transmission/reception part 121 determines whether the enable bit 430 is on or not, and, if the enable bit 430 is on (if the reception processing needs to be continued), proceeds to Step 906. On the other hand, if the enable bit 430 is off, in Step 905, the transmission/reception part 121 waits until the enable bit 430 again turns on. Then, when the enable bit 430 again turns on, the transmission/reception part 121 proceeds to Step 903, and discards the received data.

In Step 906, the transmission/reception part 121 copies the received data in an area (buffer area) of the main memory 102 specified by the address 440 of an entry specified by the write index 432. Further, the transmission/reception part 121 sets the size 441 depending on a received data size, and sets a value (such as "0") representing a normal end as the error state 442. Then, in Step 907, the transmission/reception part 121 increments the write index 432 of the reception queue 402, and returns to Step 901.

Figure 11:
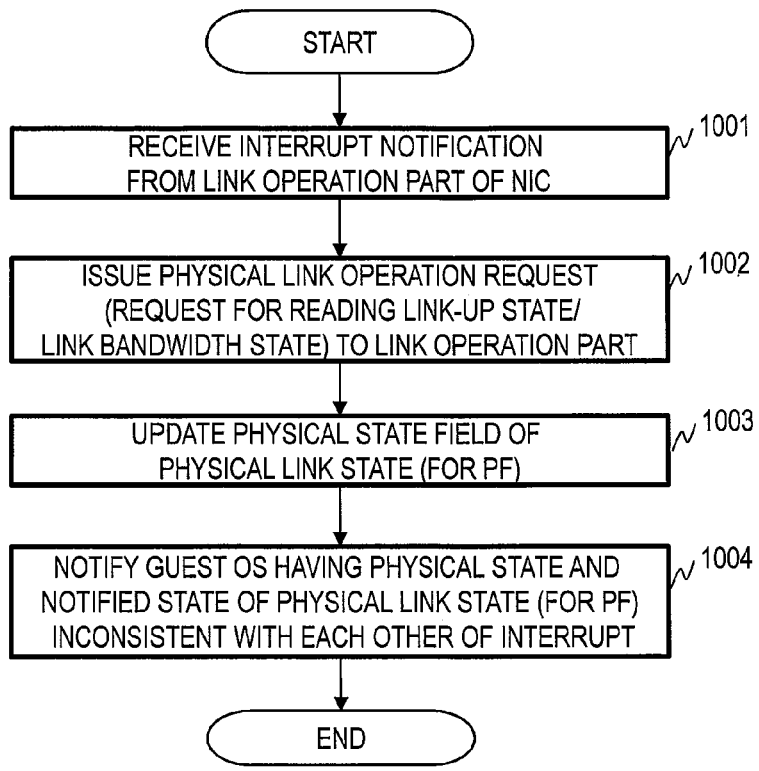
FIG. 11 is a flowchart illustrating the processing triggered by the reception of an interrupt notification from the link operation part according to the first embodiment of this invention.
Figure 12:
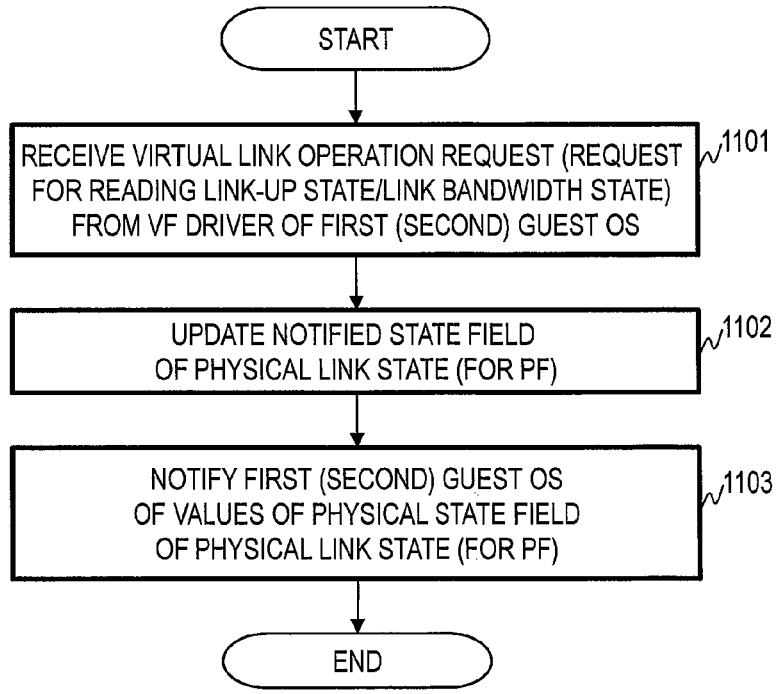
FIG. 12 is a flowchart illustrating an example of processing carried out when the PF driver receives a virtual link operation request from the VF driver according to the first embodiment of this invention.
Figure 13:
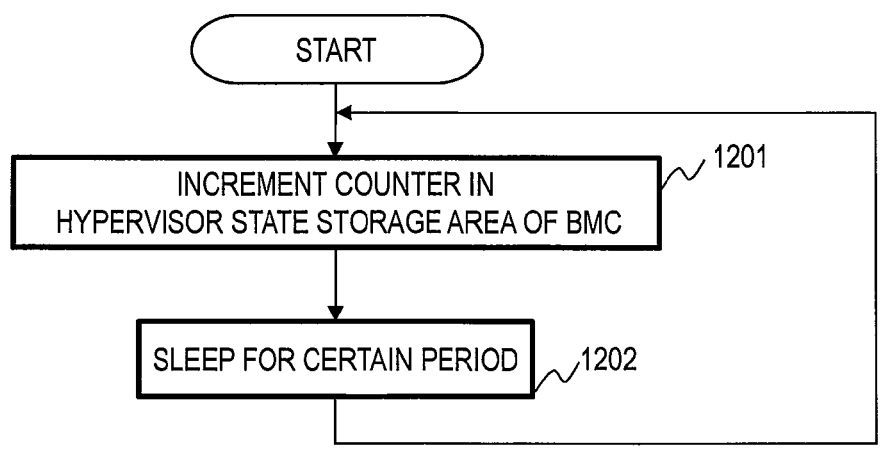
FIG. 13 is a flowchart of the periodical (cyclic) polling processing carried out by the PF driver according to the first embodiment of this invention.

FIGS. 11 to 13 are flowcharts illustrating examples of processing carried out by the PF driver 122 of the hypervisor 110. When the PF driver 122 of the hypervisor 110 receives an interrupt notification from the link operation part 120, or a virtual link operation request (request for reading the link up state/link bandwidth state) from the VF driver 123 of the first guest OS 111-1 or the second guest OS 111-2, the PF driver 122 carries out periodical polling.

FIG. 11 is a flowchart illustrating the processing triggered by the reception of an interrupt notification from the link operation part 120, FIG. 12 is a flowchart illustrating the processing triggered by the reception of a virtual link operation request from the VF driver 123, and FIG. 13 is a flowchart illustrating the periodical polling processing.

FIG. 11 is a flowchart of the processing triggered by the reception of an interrupt notification by the PF driver 122 from the link operation part 120 of the NIC 101.

In Step 1001, the PF driver 122 receives an interrupt notification from the link operation part 120 of the NIC 101.

In Step 1002, the PF driver 122 issues a physical link operation request (request for reading the link up state/link bandwidth state) to the link operation part 120 of the NIC 101. The link operation part 120 notifies, by means of the processing in the flowchart illustrated in FIG. 8, the PF driver 122 of the current physical link state (the link up state/link bandwidth state) of the NIC 101. In Step 1003, the PF driver 122 stores the link up state and the link bandwidth state notified of by the link operation part 120 in the respective fields of the physical states 210 and 220 of the link up state 201 and the link bandwidth state 202 of the physical link state 130.

Then, in Step 1004, the PF driver 122 examines whether or not values stored in the respective fields of the physical states 210 and 220 and values stored in the respective fields of the notified states 211 and 230 are consistent with each other for the link up state 201 and the link bandwidth state 202 of the physical link state 130. If inconsistency is detected in the link up state 201 and the link bandwidth state 202, the PF driver 122 issues an interrupt notification to the VF driver 123 of the corresponding first guest OS 111-1 or second guest OS 111-2.

FIG. 12 is a flowchart illustrating an example of processing carried out when the PF driver 122 receives a virtual link operation request from the VF driver 123.

In Step 1101, the PF driver 122 receives a virtual link operation request (request for reading the link up state/link bandwidth state) from the VF driver 123 of the first guest OS 111-1 or the second guest OS 111-2.

Then, in Step 1102, the PF driver 122 updates values of the fields of the notified states 211 and 230 to the corresponding values of the physical states 210 and 220 respectively for the link up state 201 and the link bandwidth state 202 of the physical link state 130 (values in the latest state notified to each guest OS is stored). Then, in Step 1103, the PF driver 122 notifies the VF driver 123 of each of the guest OSs 111 of the updated values.

As illustrated in FIG. 2, the PF driver 122 of the hypervisor 110 couples to the VF driver 123 of the first guest OS 111-1 or the second guest OS 111-2 via the interface for the virtual link operation request/interrupt notification, and the interface is the same as the interface between the PF driver 122 and the link operation part 120 of the NIC 101. In other words, the VF drivers 123 share the same NIC 101, but the PF driver 122 enables the link operation in the same sequence as the normal sequence of the NIC by emulating the link operation part 120.

FIG. 13 is a flowchart of the periodical (cyclic) polling processing carried out by the PF driver 122. In Step 1201, the PF driver 122 is periodically activated to increment the counter 501 of the hypervisor state storage area 133 of the BMC 104. Then, in Step 1202, the PF driver 122 sleeps for a certain period. If the hypervisor 110 is operating, the counter 501 is periodically incremented by periodically repeating the above-mentioned processing.

Figure 14:
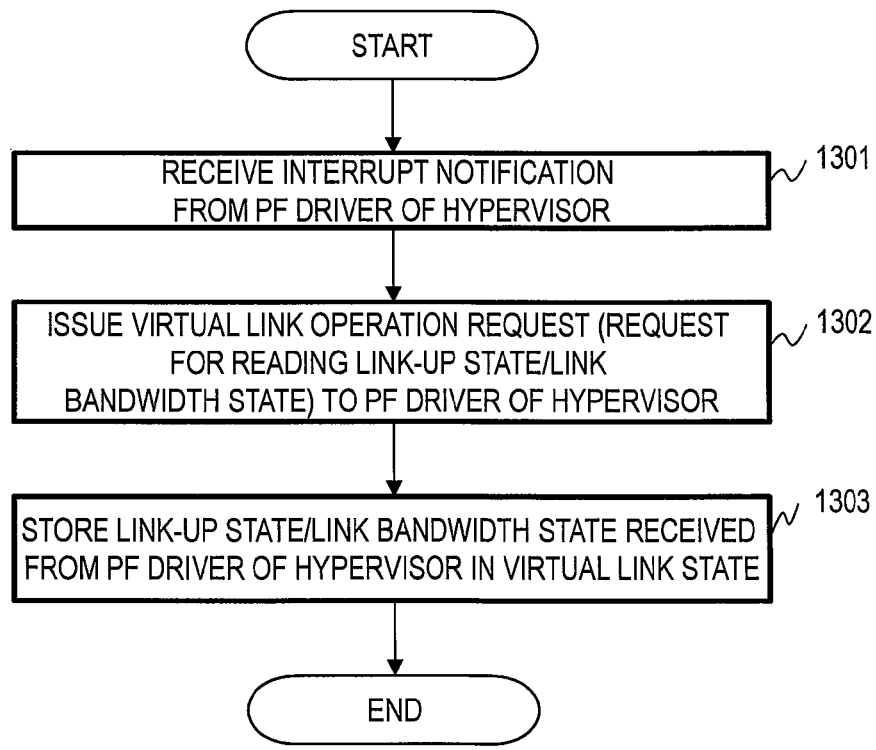
FIG. 14 is a flowchart illustrating an example of the processing carried out when the VF driver receives an interrupt notification from the PF driver according to the first embodiment of this invention.
Figure 15:
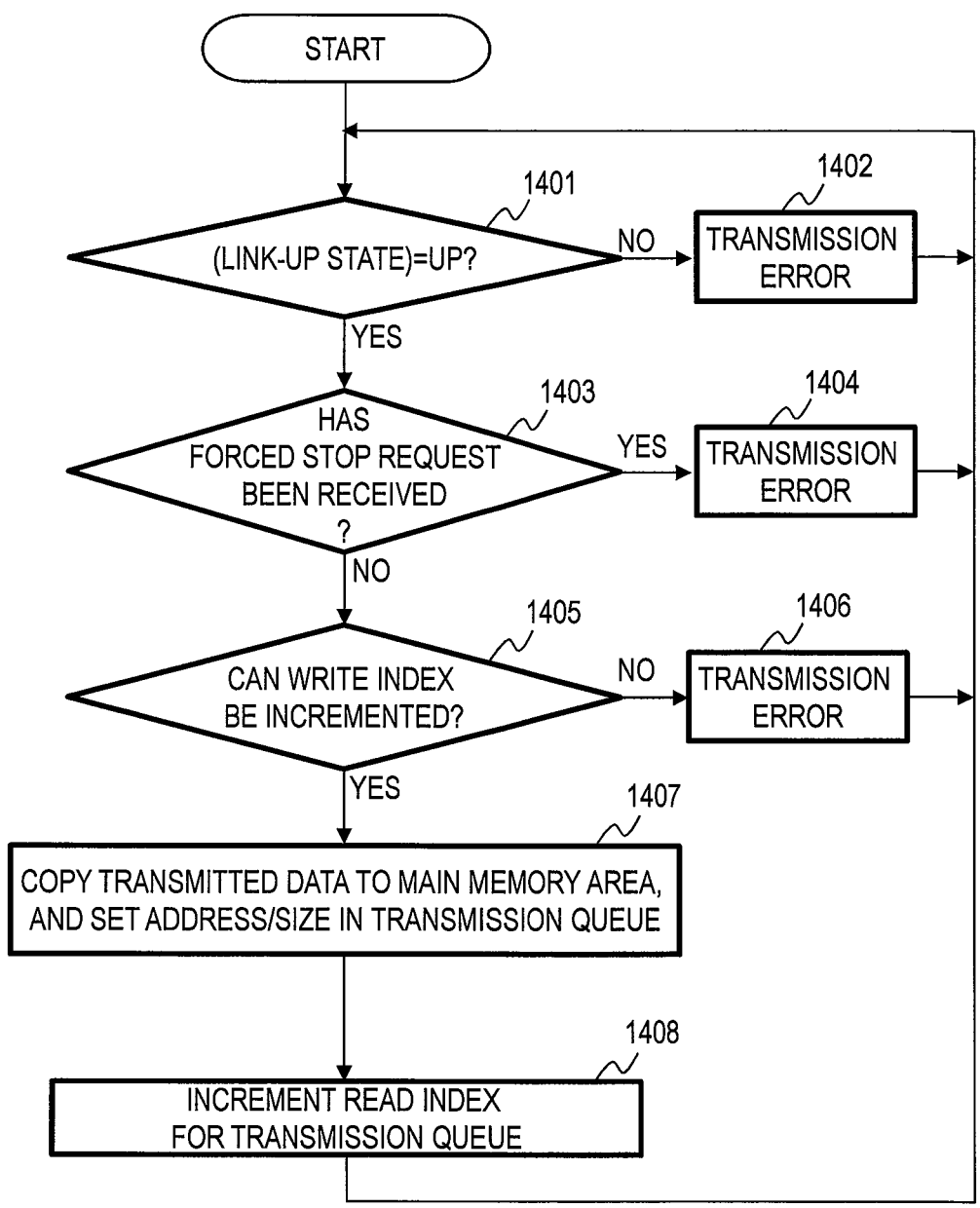
FIG. 15 is a flowchart illustrating an example of the processing triggered by the start of the data transmission, and carried out by the VF driver of the second guest OS according to the first embodiment of this invention.
Figure 16:
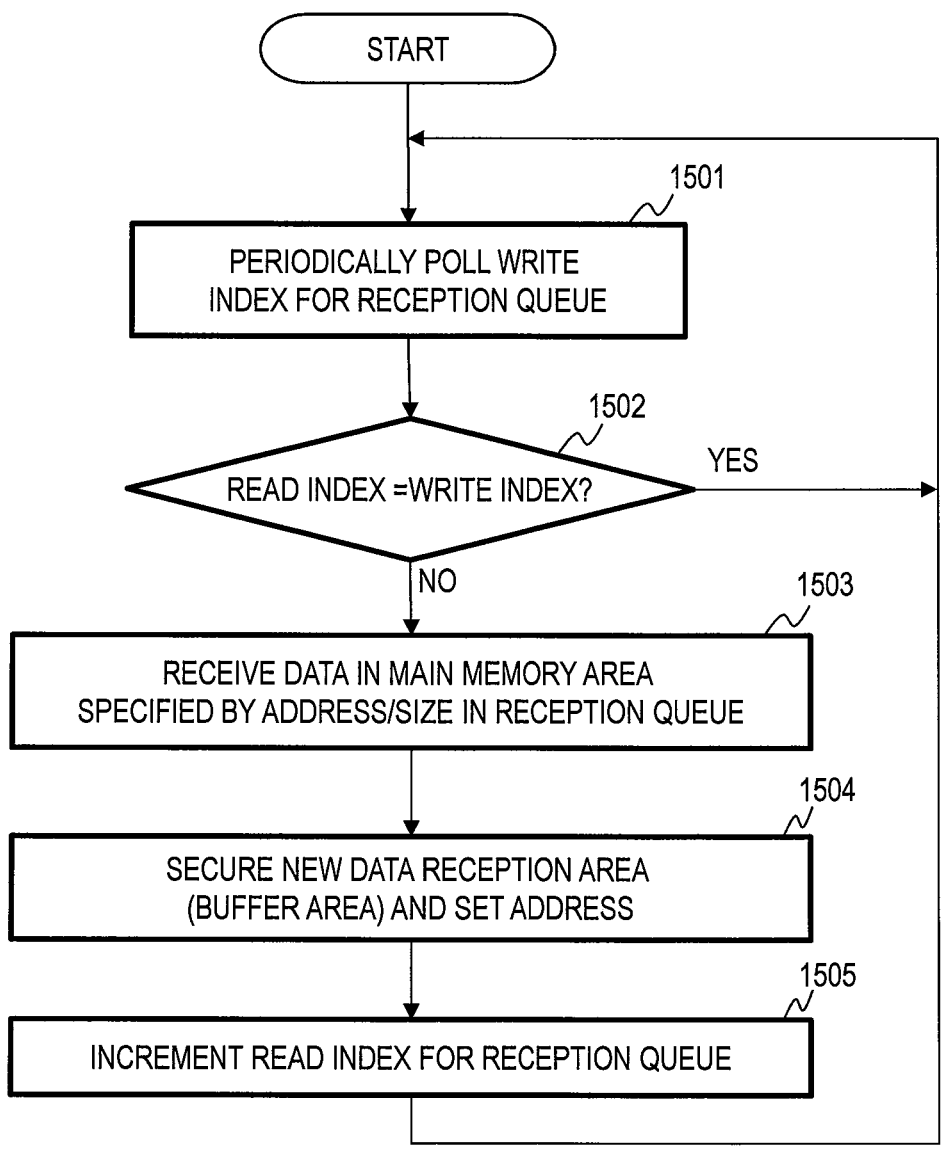
FIG. 16 is a flowchart illustrating the periodical (cyclic) polling processing by the VF driver according to the first embodiment of this invention.

FIGS. 14 to 16 are flowcharts for the VF driver 123 of the first guest OS 111-1 or the second guest OS 111-2. The VF driver 123 is triggered to start operation by the interrupt notification from the PF driver 122 of the hypervisor 110, the start of the data transmission processing, or the periodical polling. FIG. 14 is a flowchart illustrating processing triggered by the interrupt notification from the PF driver 122, FIG. 15 is a flowchart illustrating processing triggered by the start of the data transmission processing, and FIG. 16 is a flowchart illustrating processing triggered by the periodical polling.

FIG. 14 is a flowchart illustrating an example of the processing carried out when the VF driver 123 receives an interrupt notification from the PF driver 122.

In Step 1301, the VF driver 123 receives the interrupt notification from the PF driver 122. In Step 1302, the VF driver 123 issues a virtual link operation request (request for reading the link up state/link bandwidth state) to the PF driver 122. The PF driver 122 notifies the VF driver 123 of the current link-up state/link bandwidth state of the PF 141 and VFs 142 following the sequence illustrated in FIG. 12, and, in Step 1303, the VF driver 123 sets values of the received respective states to the link up state 301 and the link bandwidth state 302 of the virtual link state 131.

As a result of the processing, the virtual link state 131 of each of the guest OSs 111 is updated by the current link-up state and the link bandwidth state of the VF 142 assigned to the guest OS 111.

FIG. 15 is a flowchart illustrating an example of the processing triggered by the start of the data transmission, and carried out by the VF driver 123 of the second guest OS 111-2. In Step 1401, the VF driver 123 of the second guest OS 111-2 determines whether the link-up state is stored in the link-up state 301 field of the virtual link state 131 or not (whether the state is recognized as the link-up state or not). If the link-up state is not stored, the VF driver 123 proceeds to Step 1402, and responds to the second guest OS 111-2 with a transmission error.

Then, in Step 1403, the VF driver 123 of the second guest OS 111-2 determines whether a forced stop request (notification of stop of use of the NIC 101) is received via the emergency link 150 from the monitoring part 124 or not (whether further data transmission processing from the second guest OS 111-2 is restrained from starting due to a failure of the hypervisor 110 or not). If the forced stop request has been received from the monitoring part 124, the VF driver 123 of the second guest OS 111-1 proceeds to Step 1404, and responds to the second guest OS 111-2 with a transmission error.

Then, in Step 1405, the VF driver 123 of the second guest OS 111-2 determines whether the write index 412 of the transmission queue 401 can be incremented or not (whether a free entry exists in the transmission queue 401). If a free entry does not exist, the VF driver 123 proceeds to Step 1406, and responds to the second guest OS 111-2 with a transmission error.

Further, in Step S1407, the VF driver 123 of the second guest OS 111-2 copies the transmitted data to a buffer area secured on the main memory 102, and sets the address and the size of the buffer area to fields of the address 420/size 421 specified by the write index 412. Then, in Step 1408, the VF driver 123 increments the write index 412.

It should be noted that the VF driver 123 of the first guest OS 111-1 carries out the processing in Steps 1401 to 1408 when the transmission starts. The VF driver 123 of the first guest OS 111-1, however, does not stop the communication even if the hypervisor 110 fails, and the processing in Step 1403 therefore does not need to be carried out.

FIG. 16 is a flowchart illustrating the periodical (cyclic) polling processing by the VF driver 123. In Step 1501, the VF driver 123 periodically polls the value of the write index 432 of the reception queue 402.

Then, in Step 1502, the VF driver 123 determines whether the values of the read index 431 and the write index 432 are coincident with each other or not (whether data which has not been received is enqueued or not). If the values are coincident with each other (if data which has not been received does not exist), the VF driver 123 returns to Step 1501, and if the values of the read index 431 and the write index 432 are not coincident with each other (data which has not been received exists), the VF driver 123 proceeds to Step 1503.

In Step 1503, the VF driver 123 determines that the error state 442 field of an entry specified by the write index 432 is the normal end (such as 0), and then receives data in a buffer area on the main memory 102 specified by the fields of the address 440/size 441.

Then, in Step 1504, the VF driver 123 secures a new buffer area, and sets an address of the buffer area to the field of the address 440. Further, in Step 1505, the VF driver 123 increments the read index 431.

As a result of the above-mentioned processing, the data received by the NIC 101 and held in the reception queue 402 can be read (received) by the VF driver 123.

Figure 17:
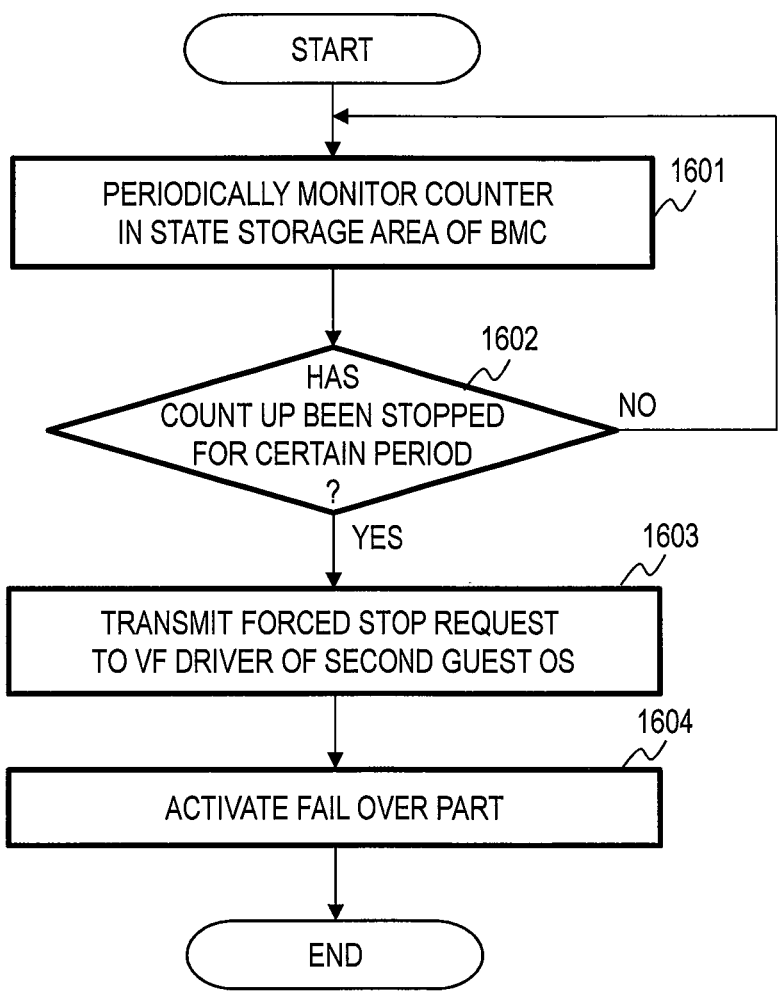
FIG. 17 is a flowchart illustrating an example of processing carried out by the monitoring part according to the first embodiment of this invention.
Figure 18:
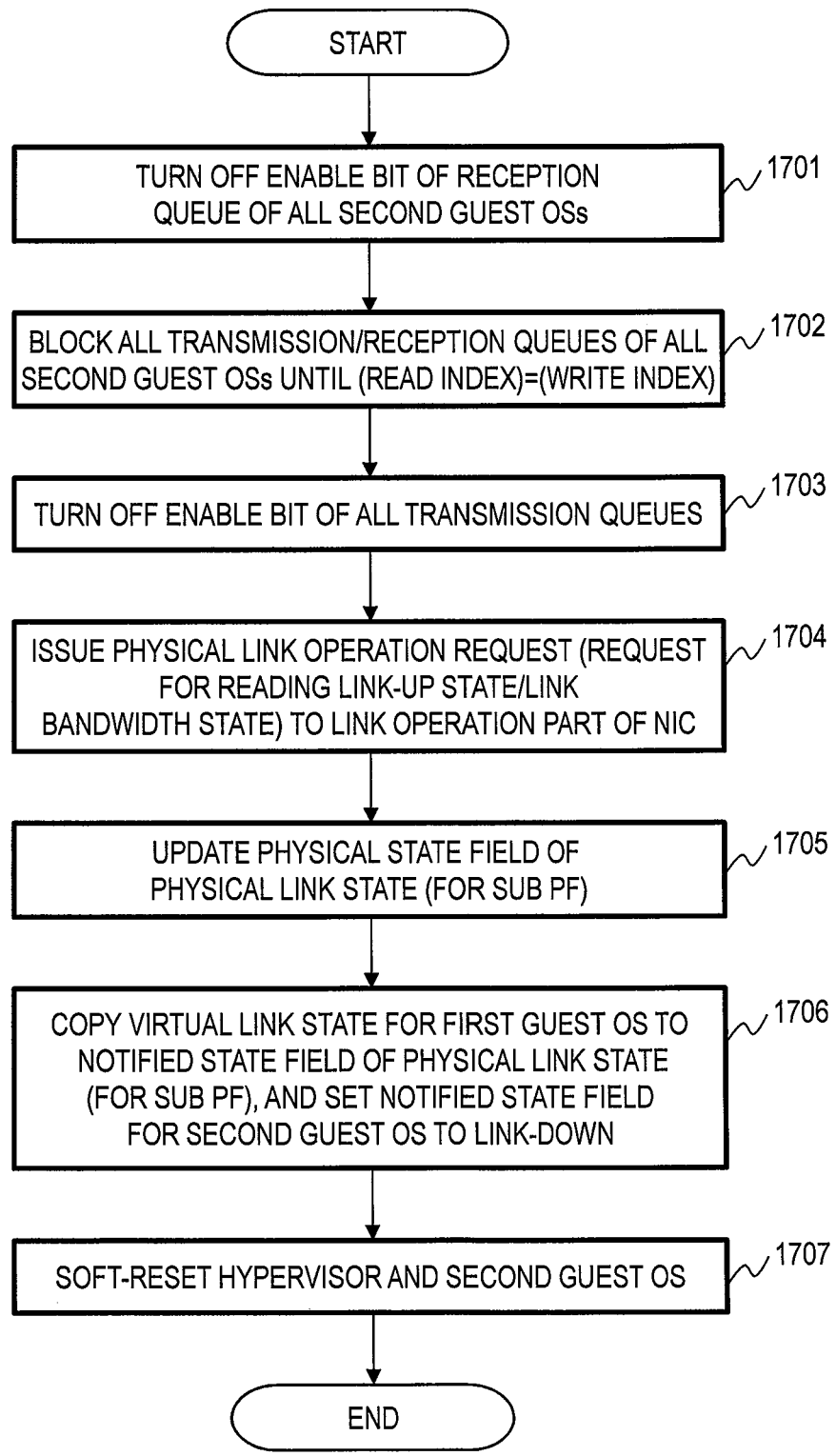
FIG. 18 is a flowchart illustrating an example of processing carried out by the failover part according to the first embodiment of this invention.

FIGS. 17 and 18 are flowcharts illustrating examples of processing carried out by the monitoring part 124 and the failover part 125 of the sub PF driver 122A of the first guest OS 111-1.

The sub PF driver 122A operates the monitoring part 124 and the failover part 125. Then, if the hypervisor 110 fails, the same processing as that carried out by the PF driver 122 illustrated in FIGS. 11 and 12 is carried out.

FIG. 17 is a flowchart illustrating an example of processing carried out by the monitoring part 124. The monitoring part 124 periodically (cyclically) polls the BMC 104. In Step 1601, the monitoring part 124 periodically acquires the count of the counter 501 in the hypervisor state storage area 133 of the BMC 104. Then, in Step 1602, the monitoring part 124 determines whether the count up by the counter 501 has been stopped for the certain period or more or not. If the count up by the counter 501 has not stopped for the certain period or more, the monitoring part 124 determines that the hypervisor 110 is normally operating, and returns to Step 1601.

On the other hand, if the count up by the counter 501 has stopped for the certain period or more, the monitoring part 124 determines that abnormality has occurred to the hypervisor 110, in Step 1603, transmits a forced stop request to the second guest OS 111-2, and then activates the failover part 125 in Step 1604.

On this occasion, the forced stop request to the second guest OS 111-2 is intended to restrain the further data transmission processing from the second guest OS 111-2 from being started because the abnormality on the hypervisor 110 has occurred. Therefore, a notification is made via the emergency link 150. If a plurality of guest OSs exist, a plurality of emergency links 150 are provided depending on the number of guest OSs. Then, the forced stop request to the plurality of guest OSs 111-2 to n includes stop of use of the NIC 101 (I/O device).

FIG. 18 is a flowchart illustrating an example of processing carried out by the failover part 125. The failover part 125 is triggered to start the processing by the activation from the monitoring part 124 in Step 1604 of FIG. 17.

The failover part 125 carries out waiting until full completion of network I/Os in operation (Steps 1701 to 1703), reconfiguration of the physical link state 130 on the main memory 102 (Steps 1704 to 1706), and soft-reset of the hypervisor 110 and the second guest OS 111-2 (Step 1707).

Then, the sub PF driver 122A reconfigures the physical link state 130A, and if the hypervisor 110 fails, the first guest OS 111-1 issues a virtual link operation request not to the PF driver 122, but to the sub PF driver 122A. The VF driver 123 of the first guest OS 111-1 can thus carry out a virtual link operation (reading the link-up state/link bandwidth state) even after the hypervisor 110 has failed. The transmission/reception processing is carried out without the interposition of the hypervisor 110 as illustrated in FIGS. 15 and 16, and the VF driver 123 of the first guest OS 111-1 can therefore continue the I/O from/to the network via the NIC 101 even after the hypervisor 110 has failed.

Moreover, the failover part 125 waits until the full completion of the network I/Os in operation, and then soft-resets the hypervisor 110 and the second guest OSs 111-2 to 111-$n$, thereby guaranteeing that memory areas used by the hypervisor 110 and the second guest OSs 111-2 to 111-$n$ are not destroyed by the network I/Os in operation during the reactivation of the hypervisor 110 and the second guest OSs 111-2 to 111-$n$. As a result, restart of normal operations of the hypervisor 110 and the second guest OSs 111-2 to 111-$n$ can be guaranteed after the reactivation of the hypervisor 110 and the second guest OSs 111-2 to 111-$n$, and a resumed operation can be realized in the configuration illustrated in FIG. 2 after the reactivation.

In Step 1701, the failover part 125 turns off the enable bit 430 of the reception queue 402 for each of the second guest OSs 111-2 to 111-$n$. As a result, contents of the main memory 120 can be prevented from being updated by reception of new data (Step 906 of FIG. 10 can be prevented from being executed).

Further, in Step 1702, the failover part 125 waits until the read indices 411 and 431 and the write indices 412 and 432 have the same values in the transmission queue 401 and the reception queue 402 for each of the second guest OSs 111-2 to 111-$n$. As a result, the complete stop of the data transmission and reception in operation can be guaranteed. Further, in Step 1703, the failover part 125 turns off the enable bit 410 of each of the transmission queues 401. Then, in Step 1704, the failover part 125 issues the physical link operation request (request for reading the link up state/link bandwidth state) to the link operation part 120 of the NIC 101, thereby acquiring the link-up state/link bandwidth state.

Then, in Step 1705, the failover part 125 sets the acquired values to the respective fields of the physical states 210 and 220 of the link-up state 201/link bandwidth state 202 existing in the physical link state 130A for the sub PF driver.

Further, in Step 1706, the failover part 125 reconfigures the notified states 211 and 230 of the physical link state 130A for the sub PF driver 122A. To the data for the first guest OS 111-1 out of the fields, the values in the link-up state 301 and the link bandwidth state 302 in the virtual link state 131 for the first guest OS 111-1 are copied.

Moreover, the link-up states for the other second guest OSs 111-2 to 111-$n$ are set to link-down states. Finally, in Step 1707, the failover part 125 soft-resets the hypervisor 110 and the second guest OSs 111-2 to 111-$n$.

SUMMARY

In this invention, in the virtual computer system where the hypervisor 110, the first guest OS 111-1, and the second guest OSs 111-2 share the main memory 102 and the NIC 101, the NIC 101 serving as an I/O device is compliant with the SR-IOV.

Then, the first guest OS 111-1 and the second guest OSs 111-2 directly issue the transmission/reception requests via the transmission/reception queues in the NIC 101 on the main memory 102 for transmitting/receiving data via the NIC 101 (I/O device) (do not transmit/receive data via the hypervisor 110).

However, for acquiring the link state of the NIC 101, the hypervisor 110 emulates the interface for acquiring the link state provided by the NIC 101, and the first guest OS 111-1 and the second guest OS 111-2 issue a request for acquiring the link state via the hypervisor 110, thereby acquiring the link state from the hypervisor 110.

For the emulation, the hypervisor 110 manages the "notified link state" for each of the guest OSs 111 in addition to the "current link state" on the main memory 102. To the "current link state", the hypervisor 110 issues the request for acquiring the link state to the NIC 101, and sets the acquired link state.

On the other hand, when the first guest OS 111-1 or the second guest OS 111-2 issues a request for acquiring the link state via the interface for acquiring the link state, the first guest OS 111-1 or the second guest OS 111-2 is notified of the values of the "current link state", and values of "the "notified link state" are synchronized with the same vales as those of the "current link state".

On the other hand, the first guest OS 111-1 or the second guest OS 111-2 stores the values of the notified link state as the values of the "recognized link state" on the main memory 102.

The network I/O via the NIC 101 is maintained by the first guest OS 111-1 when the hypervisor 110 fails in this configuration. The transmission/reception queues 132 set in advance on the main memory 102 are used for transmitting/receiving data without the transmission/reception via the hypervisor 110, and the transmission/reception of data can therefore be continued without problems. However, the acquisition of the link state from the VF driver 123 of the first guest OS 111-1 cannot be continued any longer.

Therefore, according to this invention, the first guest OS 111-1 periodically monitors the operation of the hypervisor 110, and if the monitoring part 124 detects abnormality in the hypervisor 110, the failover part 125 of the first guest OS 111-1 activates the sub PF driver 122A, thereby constructing the physical link state 130A for the sub PF driver 122A. The physical link state 130A carries out a reconstruction of the "current link state" (physical state of FIG. 3) and the "notified link state" (notified state of FIG. 3).

The "current link state" can be acquired by the first guest OS 111-1 directly issuing the request for acquiring the link state to the NIC 101 from the VF driver 123 via the sub PF driver 122A.

Moreover, as the "notified link state", a copy of the "recognized link state" managed by the first guest OS 111-1 is set to the physical link state 130A of the sub PF driver 122A. Then, the link state acquisition request is subsequently issued by the first guest OS 111-1 not to the hypervisor 110, but to the first guest OS 111-1 itself (sub PF driver 122A), thereby enabling the continued acquisition of the link state (and the continued network I/O). In other words, the VF driver 123 of the first guest OS 111-1 is provided with an I/O device by the sub PF driver 122A, and can thus operate the I/O device, thereby continuing the I/O processing.

Further, the sub PF driver 122A of the guest OS 111-1 does not use the physical link state 130 of the PF driver 122 managed by the failed hypervisor 110, and the failover part 125 of the sub PF driver 122A reconstructs the physical link state 130A in the sub PF driver 122A of the first guest OS 111-1.

On this occasion, the first guest OS 111-1, which continues the operation, only needs to switch the PF driver 122 provided by the hypervisor 110 to the own sub PF driver 122A, and hence migration of data and the like are thus not necessary, and the switching can be carried out at an extremely high speed.

On this occasion, the physical link state 130 of the failed hypervisor 110 may be influenced by the failure. According to this invention, the input/output by the I/O device is continued on the guest OS 111-1 without using the physical link state 130 which may be influenced by the failure, thereby securing the stable operation.

Moreover, according to this invention, the emergency links 150 coupling the first guest OS 111-1 and the other guest OSs 111-2 to n are provided, and, as a result, even if the hypervisor 110 fails, the VF driver 123 of the first guest OS 111-1 can notify the other OSs 111-2 to n of the forced stop of the I/O processing.

Then, the OSs 111-2 to n other than the first guest OS 111-1 and the hypervisor 110 can be soft-reset to restart, thereby recovering from the failure.

Moreover, the failover part 125 of the VF driver 123 of the first guest OS 111-1 transmits a command of the forced stop to the other OSs 111-2 to n and the hypervisor 110, and waits until transmission/reception via I/O devices of the respective OSs 111-2 to n are finished. As a result, after all I/O transactions on the respective guest OSs 111-1 to 111-*n* are completed, the guest OSs 111 and the hypervisor 110 can be soft-reset, thereby preventing transmitted/received data from being damaged. In other words, after all the I/O transactions via the physical I/O devices have been completed, the guest OSs 111 and the hypervisor 110 are soft-reset.

Moreover, according to this invention, if an application or a service providing an important business task is arranged on the first virtual computer 11-1 on which the first guest OS 111-1 having the sub PF driver 122A is operating; even when the hypervisor 110 fails, the business task can be continued, thereby securing redundancy. For example, a storage control OS for controlling a SAN storage is operated as the first guest OS 111-1 on the first virtual computer 11-1, and guest OSs 111 for using the SAN storage are operated on the other virtual computers 11-2 to n. In this example, even if the hypervisor 110 fails, the storage control OS on the first virtual computer 11-1 does not stop, thereby providing a virtual computer system excellent in redundancy.

Second Embodiment

According to the first embodiment of this invention, when the failover part 125 is activated, the physical link state 130A for the sub PF driver 122A is reconfigured. According to a second embodiment of this invention, each time the PF driver 122 updates the physical link state 130 for the PF driver 122, the physical link state 130A for the sub PF driver 122A is also updated. As a result, the reconfiguration according to the first embodiment is no longer necessary, and the failover processing can be carried out more quickly.

The second embodiment is configured in the same way as the first embodiment, and a part of the processing is different. Different points from the first embodiment include processing carried out when the PF driver 122 receives the interrupt notification (FIG. 19), processing triggered by the PF driver 122 receiving the virtual link operation request (FIG. 20), and processing carried out by the failover part 125 (FIG. 21). A description is now given of these points.

Figure 19:
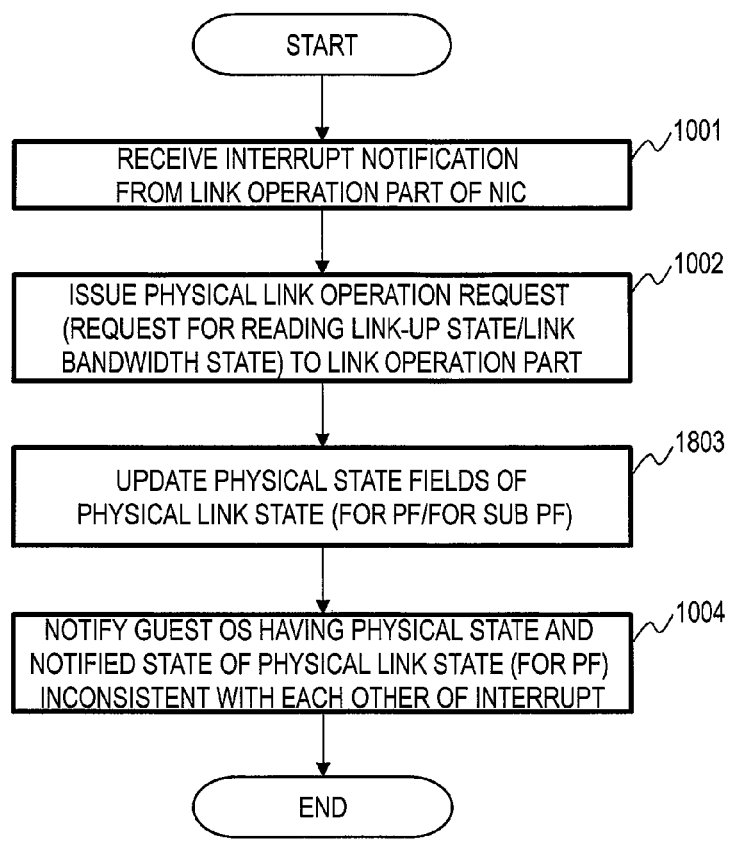
FIG. 19 is a flowchart of the processing carried out when the PF driver 122 receives the interruption notification from the link operation part according to a second embodiment of this invention.

FIG. 19 is a flowchart of the processing carried out when the PF driver 122 receives the interruption notification from the link operation part 120 of the NIC 101. This flowchart is different from the flowchart illustrated in FIG. 11 according to the first embodiment in such a point that Step 1803 is carried out in place of Step 1003.

In Step 1803, the link-up state and the link bandwidth state notified of from the link operation part 120 are stored in the respective fields of the physical states 210 and 220 of the link-up state 201 and the link bandwidth state 202 in the physical link state 130 for the PF driver 122, and the values are notified to a first guest OS 111-1. Then, the first guest OS 111-1 stores the values in the respective fields of the physical link state 130A for the sub PF driver 122A.

As a result of the processing, the physical link state 130A of the sub PF driver 122A is updated by the link-up state and the link bandwidth state received by the first guest OS 111-1 from the PF driver 122. Thus, the physical link state 130 of the PF driver 122 and the physical link state 130A of the sub PF driver 122A can be synchronized with the link-up state and the link bandwidth state notified of from the link operation part 120.

Figure 20:
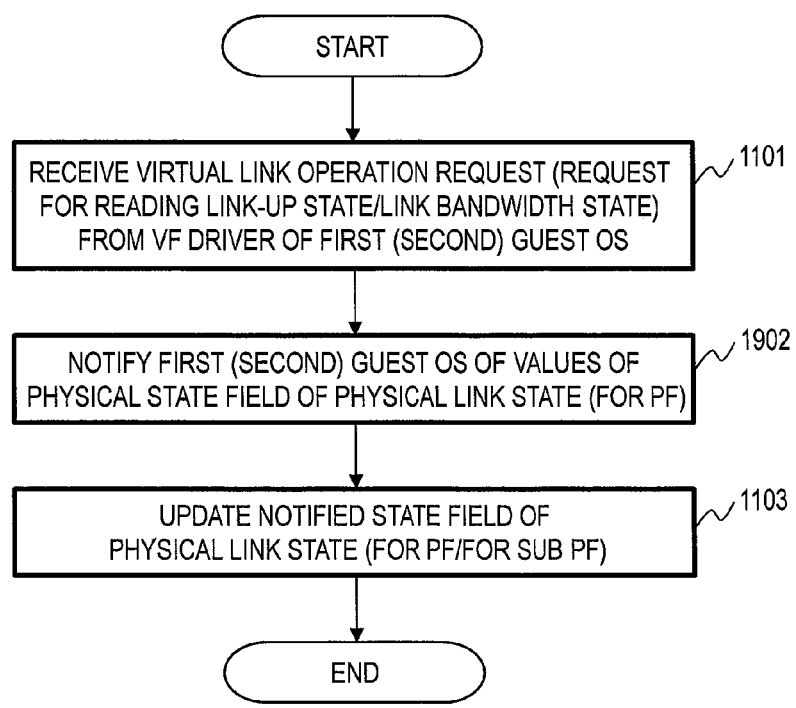
FIG. 20 is the flowchart of the processing carried out when the PF driver receives the virtual link operation request from the VF driver according to the second embodiment of this invention.
Figure 21:
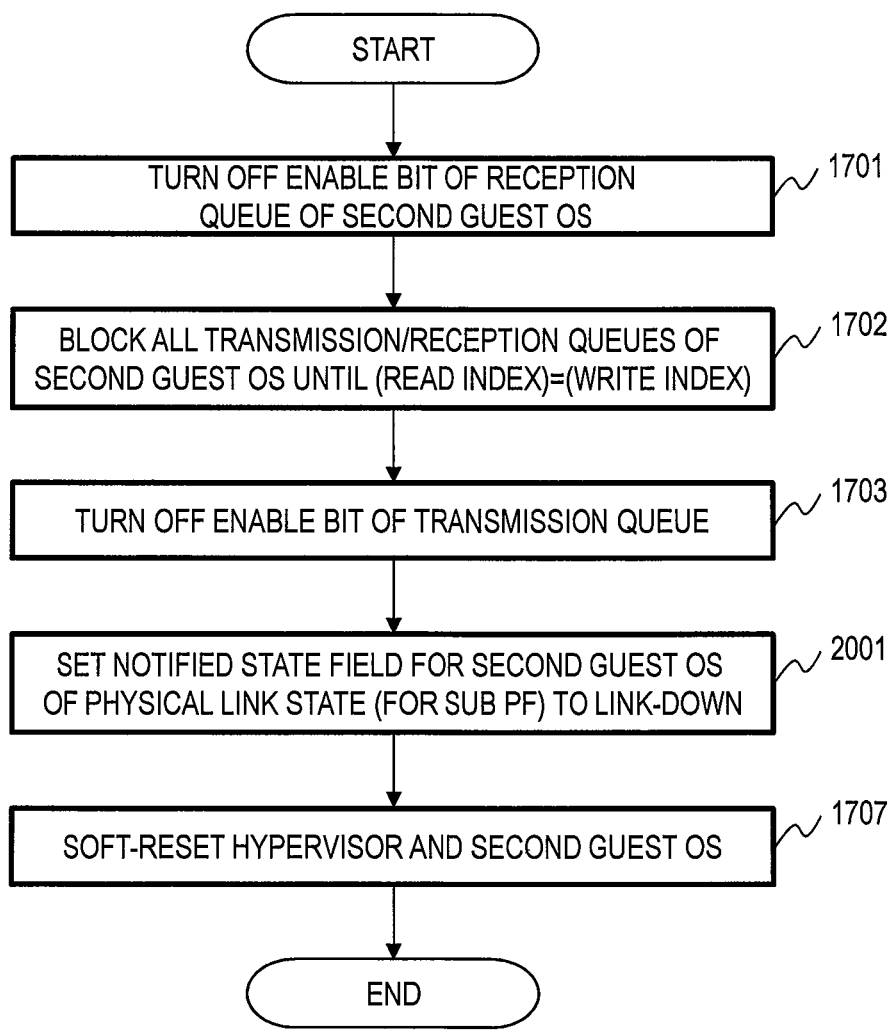
FIG. 21 is a flowchart illustrating processing carried out by the failover part of the sub PF driver according to the second embodiment of this invention.

FIG. 20 is a flowchart of the processing carried out when the PF driver 122 receives the virtual link operation request from the VF driver 123. This flowchart is different from the flowchart illustrated in FIG. 12 according to the first embodiment in such a point that Step 1902 is carried out in place of Step 1102.

In Step 1902, the PF driver 122 updates values of the fields of the notified states 211 and 230 to the corresponding values of the physical states 210 and 220 respectively for the link up state 201 and the link bandwidth state 202 of the physical link state 130 (values in the latest state notified to the each guest OS are stored). Then, the PF driver 122 notifies the first guest OS 111-1 of the values. The first guest OS 111-1 similarly updates the physical link state 130A for the sub PF driver 122A, and updates the link-up state 201 and the link bandwidth state 202 of the physical link state 130A for the sub PF driver 122A by the values received from the PF driver 122.

FIG. 21 is a flowchart illustrating processing carried out by the failover part 125 of the sub PF driver 122A. This flowchart is different from the flowchart illustrated in FIG. 18 according to the first embodiment in such a point that Step 2001 is carried out in place of Steps 1704 to 1706.

In Step 2001, the failover part 125 sets the value of the field of the notified state 211 for a second guest OS 111-2 (such as VF2 in FIG. 3) to the link down for the respective fields of the link-up state 201 of the physical link state 130A for the sub PF driver 122A. The fields of the notified state 211 set to the link down are VFs 142 used by the VF drivers 123 other than that of the first guest OS 111-1.

The other fields of the physical link state 130A for the sub PF driver 122A have been set in Step 1803 of FIG. 19 and in Step S1902 of FIG. 20 as described above, and hence the failover part 125 does not need to newly set these fields.

As a result of the above-mentioned processing, also in the second embodiment, the sub PF driver 122A uses the physical link state 130A synchronized by the notification from the link operation part 120 on the first guest OS 111-1 without duplicating the physical link state 130 of the failed hypervisor 110. As a result, if the hypervisor 110 fails, the VF driver 123 of the first guest OS 111-1 can continue the I/O processing without stopping the I/O processing, thereby continuously providing business tasks and services.

Such an example that the NIC 101 is used as the I/O device has been described in the respective embodiments, but the I/O device may be any I/O device compliant with the SR-IOV, and the embodiments can be applied to the HBA and the converged network adapter (CNA) compliant with the SR-IOV.

Moreover, in the first and second embodiments, such an example that the failure of the hypervisor 110 is detected by the counter 502 of the BMC 104 has been described, but a publicly or widely known method such as the heartbeat of the hypervisor 110 can be applied, and the detection method is not limited to the above-mentioned example. Moreover, such an example that the failure of the hypervisor 110 is monitored by the monitoring part 124 of the sub PF driver 122A has been described, but the configuration is not limited to this example, and the monitoring part 124 may operate not on the sub PF driver 122A, but on the first guest OS 111-1.

It should be noted that the configuration of the computers and the like, the processing part, the processing means, and the like in part or entirety may be realized by dedicated hardware.

Moreover, the various kinds of software exemplified in the embodiments can be stored in a storage medium of electromagnetic type, electronic type, and optical type (such as non-transitory storage medium), and can be downloaded via communication networks such as the Internet onto the computer.

It should be noted that this invention is not limited to the above-mentioned embodiments, and includes various modification examples. For example, the above-mentioned embodiments have been detailed for the sake of a description easy to understand, and this invention is not necessarily limited to a case including all the configurations described above.

What is claimed is:

1. A control method for a physical I/O device, in a computer comprising a processor, a memory, and the I/O device, the I/O device being shared by a hypervisor and a first guest OS,
    the I/O device comprising a physical function and a virtual function, the hypervisor comprising a physical driver for using the physical function, the first guest OS comprising a virtual driver for using the virtual function,
    the control method comprising:
    a first step of acquiring, by the hypervisor, a state of the I/O device via the physical driver;
    a second step of monitoring, by the first guest OS, the hypervisor, thereby determining whether the hypervisor has been brought into a predetermined state or not;
    a third step of activating, by the first guest OS, a sub physical driver for operating the I/O device when the first guest OS determines that the hypervisor has been brought into the predetermined state; and
    a fourth step of carrying out, by the first guest OS, transmission of data and reception of data via a queue previously stored on the memory,
    wherein the third step comprises acquiring, by the first guest OS, a state of the I/O device from the virtual driver via the sub physical driver, the state of the I/O device comprising a link state and a bandwidth state for each of the physical function and the virtual function, and then activating the sub physical driver.

2. The control method for an I/O device according to claim 1, wherein the first step comprises:
    acquiring, by the hypervisor, the state of the I/O device via the physical driver, and notifying the first guest OS of the acquired state; and updating, by the first guest OS, a state used by the sub physical driver by the state received from the hypervisor, and wherein the third step comprises activating, by the first guest OS, the sub physical driver in the updated state.

3. The control method for an I/O device according to claim 1, wherein the I/O device is shared by a second guest OS in addition to the hypervisor and the first guest OS, and further comprises an emergency link for the first guest OS and the second guest OS communicating to/from each other, and wherein the second step further comprises:

monitoring, by the first guest OS, the hypervisor, thereby determining whether the hypervisor has been brought into the state presenting the abnormality as the predetermined state or not; and notifying, by the first guest OS, when the first guest OS determines that the abnormality has occurred to the hypervisor, the second guest OS to stop use of the I/O device via the emergency link.

4. The control method for an I/O device according to claim 3, wherein the second step further comprises:

notifying, by the first guest OS, when the first guest OS determines that the abnormality has occurred to the hypervisor, after the second guest OS has completed an I/O transaction, the second guest OS to stop use of the I/O device via the emergency link.

5. The control method for a physical I/O device according to claim 1, wherein the second step comprises monitoring, by the first guest OS, the hypervisor, thereby determining whether the hypervisor has been brought into a state presenting abnormality as the predetermined state or not.

6. A computer system, comprising:

a physical I/O device;

a processor connected to the I/O device;

a memory connected to the processor and storing instructions that, when executed by the processor, causes the processor to execute a virtual computer system including a hypervisor and a first guest OS, wherein the I/O device is shared by the hypervisor and the first guest OS, the I/O device includes a physical function and a virtual function, the hypervisor includes a physical driver for using the physical function, and acquiring a state of the I/O device via the physical driver, and the first guest OS includes:

a virtual driver for using the virtual function;

a monitoring part for monitoring the hypervisor, thereby determining whether the hypervisor has been brought into a predetermined state or not;

a failover part for activating a sub physical driver for operating the I/O device when the monitoring part determines that the hypervisor is brought into the predetermined state; and a queue previously stored on the memory for carrying out transmission of data and reception of data, wherein the failover part acquires a state of the I/O device from the virtual driver via the sub physical driver, a link state and a bandwidth state for each of the physical function and the virtual function, and then activates the sub physical driver.

7. The virtual computer system according to claim 6, wherein:

the hypervisor acquires the state of the I/O device via the physical driver, and notifies the first guest OS of the acquired state;

the first guest OS updates a state used by the sub physical driver by the state received from the hypervisor as a physical link state; and the failover part activates the sub physical driver in the updated physical link state.

8. The virtual computer system according to claim 6, wherein:

the I/O device is shared by a second guest OS in addition to the hypervisor and the first guest OS, and further comprises an emergency link for the first guest OS and the second guest OS communicating to/from each other;

the monitoring part monitors the hypervisor, thereby determining whether the hypervisor has been brought into the state presenting the abnormality as the predetermined state or not; and the failover part notifies, when the monitoring part determines that the abnormality has occurred to the hypervisor, the second guest OS to stop use of the I/O device via the emergency link.

9. The virtual computer system according to claim 8, wherein the failover part notifies, when the monitoring part determines that the abnormality has occurred to the hypervisor, after the second guest OS has completed an I/O transaction, the second guest OS to stop use of the I/O device via the emergency link.

10. The virtual computer system of claim 6, wherein the monitoring part determines whether the hypervisor has been brought into a state presenting abnormality as the predetermined state or not.

* * * * *